United States Patent

[11] 3,579,191

[72] Inventors John Hugh Andreae
Christchurch, New Zealand;
Brian Ronald Gaines, Cambridge; Peter White, Bishop's Stortford, England

[21] Appl. No. 678,589
[22] Filed Oct. 27, 1967
[45] Patented May 18, 1971
[73] Assignee International Standard Electric Corporation
[32] Priority Oct. 31, 1966
[33] Great Britain
[31] 48616/66

[54] NETWORK USING ADAPTIVE ELEMENTS
10 Claims, 6 Drawing Figs.

[52] U.S. Cl. 340/172.5
[51] Int. Cl. G06f 15/18, G06f 15/56
[50] Field of Search 340/172.5; 235/157; 307/201; 179/18

[56] References Cited

UNITED STATES PATENTS

| | | | |
|---|---|---|---|
| 3,103,648 | 9/1963 | Hartmanis | 340/172.5 |
| 3,165,644 | 1/1965 | Clapper | 340/172.5 |
| 3,238,504 | 3/1966 | Crane | 340/172.5 |
| 3,246,302 | 4/1966 | Martin et al. | 340/172.5 |
| 3,273,125 | 9/1966 | Jakowatz | 340/172.5 |
| 3,303,473 | 2/1967 | Clapper | 340/172.5 |
| 3,327,291 | 6/1967 | Lee | 340/172.5 |

OTHER REFERENCES

Carne, E. B., ELEC. REALIZATION OF FUNCTIONAL NERVE NETS, Tech. Doc. Rep. No. ASD-TDR-62-266 Melpap Inc. Falls Church, Va., June 1962

Lee, R. J., S.P.I.C.E., Melpar Inc. Falls Church, Va., June 1959

*Primary Examiner*—Paul J. Henon
*Assistant Examiner*—Sydney Chirlin
*Attorneys*—C. Cornell Remsen, Jr., Rayson P. Morris, Percy P. Lantzy, J. Warren Whitesel, Phillip A. Weiss and Delbert P. Warner

ABSTRACT: A communication network is provided using information storage control means for selecting a direct path from calling to called portions of the network. The network contains nodes and links therebetween. Each of the links has a switch controlled by an adaptive element therein. The adaptive element includes means for controlling the probability that a signal which emanates from the node traverses the link containing the adaptive element. Means operated in cooperation with the adaptive element are further provided so that any node which receives and passes on a signal is inhibited from receiving a further signal without first being reset.

NETWORK USING ADAPTIVE ELEMENTS

The present invention relates to the use of adaptive elements in communication networks. The term adaptive element is used to mean an information storage device which includes at least one element whose state or condition determines a range of storage levels. The state or condition of the said element or elements is arranged to change in such a way, in response to signals input to the device, that the magnitude of the change in the stored level made by the device in response to the individual input signal has a value determined directly or statistically by the values of two or more parameters. The parameters include the value of the input signal and also the level stored in the device immediately prior to receiving the said signal.

The embodiment of the invention which is hereinafter described is conveniently realized using electronic components. However, mechanical elements or devices using magnetic, fluid, optical, electromechanical or other forms of logic may also be used. The logic scheme described is simple binary, but ternary or threshold logic may be used in adaptive elements of the appropriate construction.

Networks include, for example, the regional branch exchanges together with the linking cables in a national telephone network, or the exchanges and trunk links in an international network and also wall-mounted displays used, for example, in air traffic control or in underground railway stations. The invention has application therefore in simulating economic behavior, for example, in the general transport problem, in calculating topological properties of networks, in simulating psychological interaction, and in the allocation of economic routes through telephone networks either by modeling in real time or by simulation in faster than real time.

According to the invention, there is provided a network containing nodes and directed links therebetween, each link having therein an adaptive element as hereinbefore defined. The adaptive element in an output link from a node is arranged to control the probability that a signal which emanates from the node traverses the link. The probability is determined by the state of the adaptive element, any node which receives and passes on a signal is inhibited from receiving a further signal without first being reset.

The invention also provides a method of extracting a loop free path between an input node and an output node of a network which contains nodes having directed links therebetween. Each link has therein a switch which is controlled by an adaptive element as hereinbefore defined. Any node which receives and retransmits a signal is inhibited from receiving a further signal without first receiving a reset signal. The adaptive element for the switch of an output link from a node is arranged to control the probability that a signal which emanates from the node traverses the link. The probability is determined by the state of the adaptive element. The method includes the steps of applying a signal at the input node and when the signal appears at the output node the switches are locked in position in those links of the network through which the signal has passed.

The above-mentioned and other features of the invention will become more apparent and the invention itself will best be understood by reference to the following description taken in conjunction with the accompanying drawings in which:

FIG. 1, which is in two parts (*a*) and (*b*) is a block diagram of an adaptive element;

Figure 1:
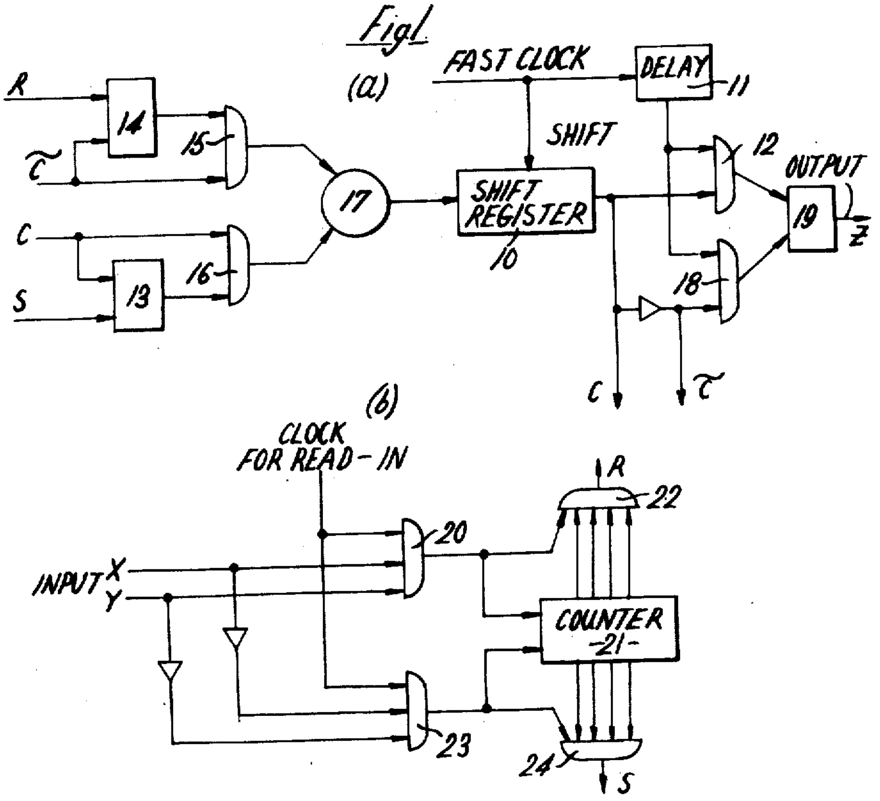
Figure 3:
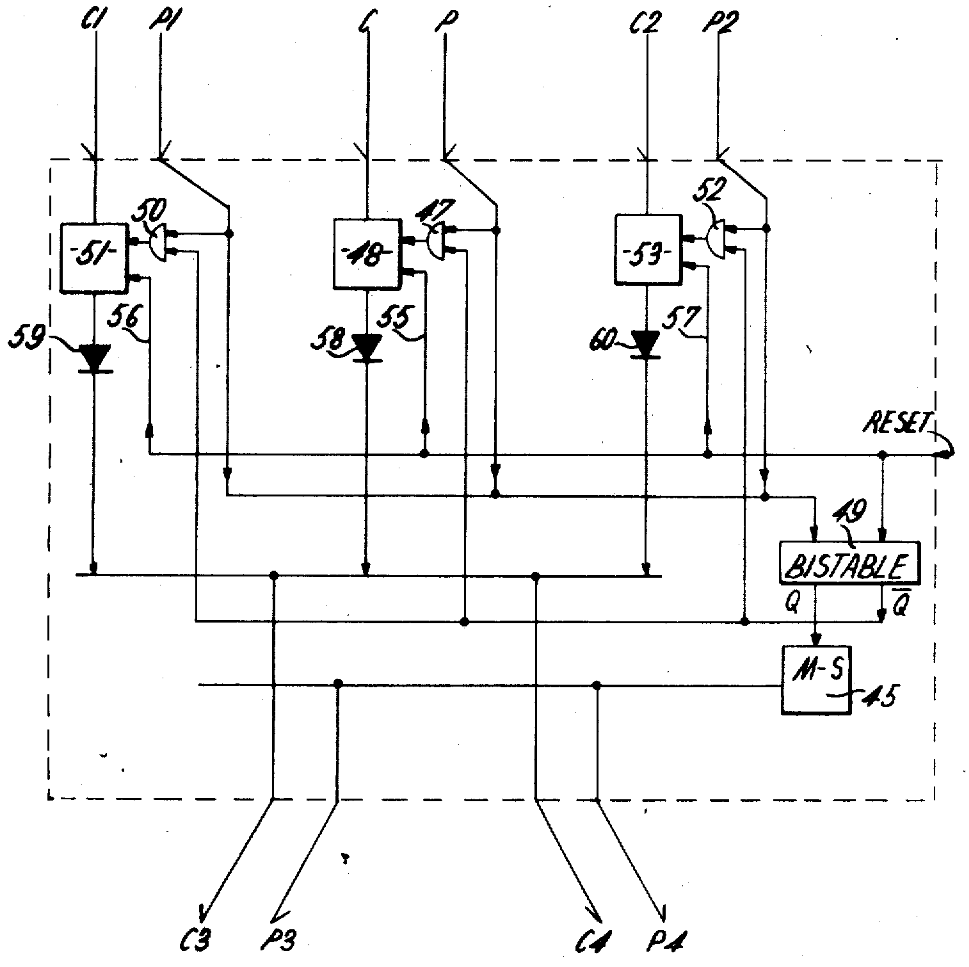
FIG. 3 shows in more detail the circuitry present in one node of the network of FIG. 2.

The bistables of FIGS. 1 and 3 are devices each having an upper and lower part which are complementary to one another. Each part has an input and an output and is capable of assuming one of two stable states, 1 or 0. When the upper part contains 1 the lower part contains 0 and vice versa. We say the device is ON if the upper part contains a 1 and usually consider only the Q output (i.e. the output from the upper part). A pulse applied to the upper input, switches the device ON, leaving it unchanged if it is ON already and causing the contents of the upper part prior to the application of the pulse to be output as Q. A pulse applied to the lower input, switches the device OFF, leaving it unchanged if it is OFF already. The lower input is generally referred to as the reset input and the upper input as the set input.

Referring now to FIG. 1(*a*) a fast clock feeds a shift signal to a shift register 10 and causes the last digit of the shift register to be output as C when the register is right shifted. The clock pulse is applied also via a delay 11 to an AND gate 12 to which C is also applied. C is applied also to the upper input of a bistable 13 and to the reset input of the bistable 14. Signals R and S are fed respectively to the upper input of bistable 14 and the reset input of bistable 13. The output of 14 is gated with $\overline{C}$, the inverse of C, at the AND gate 15. The output of 13 is gated with C at AND gate 16. The outputs of 15 and 16 are applied to the OR gate 17 whose output is introduced into the leftmost position of the shift register 10. The shift register 10 is thus continually circulating, losing digits at C and acquiring digits 0 or 1 from the output of the OR gate 17. The clock pulse is applied also via the delay 11 to an AND gate 18 where it is gated with the inverse of C, C. The output of 18 is applied to the reset input of a bistable 19. As already stated, the delayed clock pulse is gated with C at the AND gate 12 whose output is then applied to the upper input of bistable 19. The output Z of bistable 19 thus provides a stochastic or random readout of the contents of the shift register 10, the quantity being represented as the proportion of 1's or 0's, in the train formed by successive readout pulses. The precision of the representation at output Z is limited by the size of the shift register 10. If register 10 contains 100 bits then the precision in the output is 1 percent.

For the device to function as an adaptive element, and also to increase precision, the circuit of FIG. 1(*b*) is linked up with the device of FIG. 1(*a*). A clock pulse for read-in is gated at the AND gate 20 with inputs X and Y, the output of 20 is applied to a 4-bit up/down counter 21 whose several bits are applied to an AND gate 22. The output of 20 is also applied to 22 so that when the counter 21 is full and there is an output from 20 the output R of 22 is a 1. The inputs X and Y are inverted and applied to an AND gate 23 together with the clock pulse controlling read-in. The output of 23 is applied to the counter 21 and also to an AND gate 24. When the counter is full and the output of 23 is a 1, the output S of 24 is a 1. R is applied to the upper input of the bistable 14 and S to the reset input of bistable 13. The arrangement of FIGS. 1(*a*) and (*b*) thus furnishes a 1,600 level stochastic or random integrator. If the output Z functions as inverted and applied as input Y the resulting device is an adaptive element.

Figure 2:
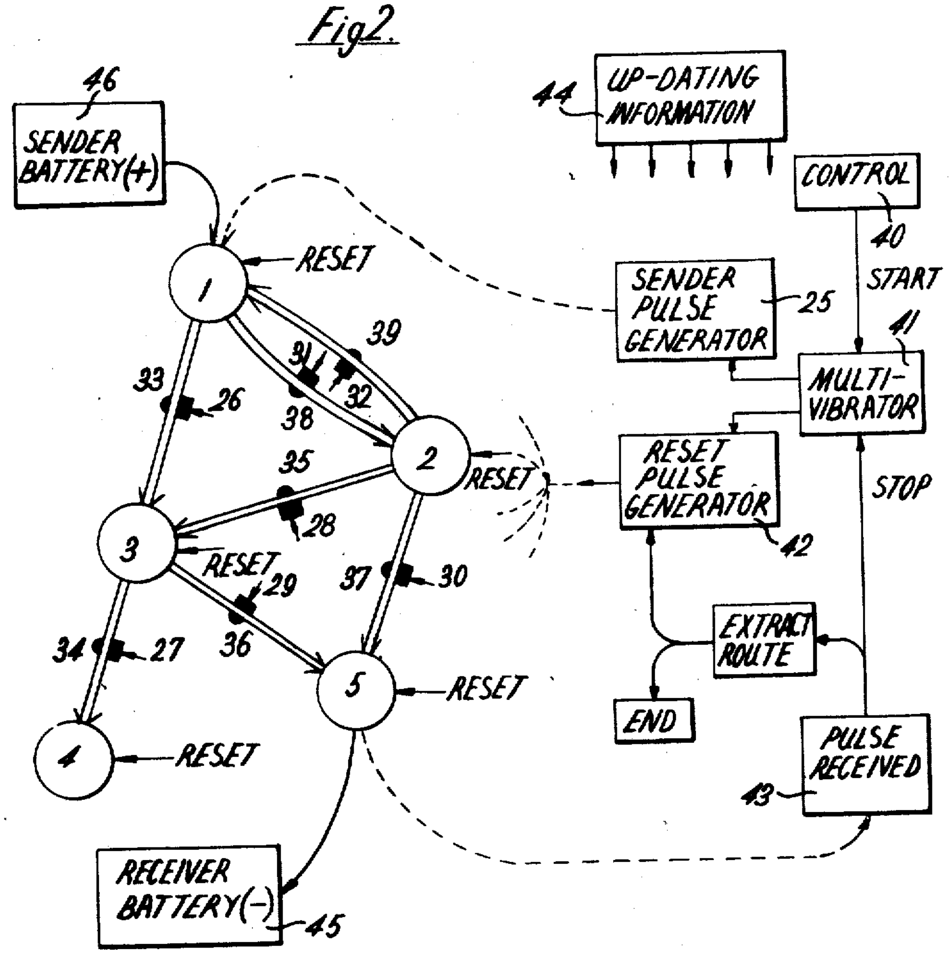
FIG. 2 illustrates a communication network.

FIG. 2 shows a network which has been constructed to have the same connectivity properties as, for example, a certain telephone exchange network. The numbers 1, 2, 3, 4 and 5 represent exchanges. The paths between the exchanges (i.e. the trunk links) are represented by the split arrows, the direction of the links being indicated by the direction of the double arrowhead. To achieve a loop-free path 3, a pulse generated by the pulse generator 25, is applied to the network at the sending exchange which may be taken without loss of generality to be 1. Each exchange which receives this pulse is inhibited immediately after passing the pulse on through its output links and eventually the pulse disappears because its path is blocked by inhibited exchanges. Each link contains a probabilistic gate, 26 to 32 in the diagram. Each time the pulse traverses the probabilistic gate of a link, a DC switch, for example, a relay associated with the switch is closed. If the pulse does not reach the receiving exchange the network is reset, all switches are reopened and exchanges freed, i.e. deinhibited.

Pulses continue to be fed into the sending exchange until a pulse arrives at the receiving exchange (which is 5 in the embodiment illustrated) or alternatively until some external condition (for example, a time limit has expired) is met. Overall control, and detection as to when a pulse has been received is carried out by having the start of the firing controlled by control 40 which activates a multivibrator 41 whose output, which is a square wave, is applied both to the pulse generator 25 which generates and fires pulses at the sending exchange and also to a reset pulse generator 42 which resets the conditions at the exchanges if no path has been found to exist or after the time limit has expired. Any successful pulse is received at the detector 43 and a route is extracted by applying a potential between the sending exchange (positive sending battery 46) and the receiving exchange (negative receiving battery 45). This potential causes the DC relays to lock in the appropriate position. Alternatively, if the switches are pulse sensitive then a locking pulse can be fired from sender to the receiver. When the route has been extracted, the reset pulse generator 42 is activated to reset all the exchanges in the network to their original condition and the multivibrator 41 is switched OFF. The route through the network may be indicated if desired, for example, on a wall-mounted display system by having indicators, for example, lamps 33 to 39 light up so as to trace out the path taken by the pulse. Information obtained by sampling the occupancy of the links of the real network may be applied by an information unit 44 and used to update continuously the settings of the adaptive elements which form the probabilistic pulse gates 26 to 32. This statistical information represents one parameter of the network. A second parameter, for example, cost rather than accessibility may be simulated by inserting in the links an appropriate delay which is proportional to the second parameter. The cheaper path will then be traversed first.

Along the length of each link, the DC line is physically separate from the line which carries the pulse signal, but of course the same line could be used for both pulse and current operation provided that the adaptive element was made immune to a direct current component and that the switch was not activated by pulse signals.

FIG. 3 illustrates a typical station, for example, a telephone exchange. C, C1 and C2 are input paths containing current-operated switches. P, P1 and P2 are the associated paths for the probe signals and contain or are controlled by adaptive elements. C3 and C4 are current-carrying output paths and P3 and P4 are the paths associated respectively with C3 and C4 which carry pulse information outwards. An incoming pulse on line P is applied through the AND gate 47 to the current switch 48 so as to close it at the same time the input pulse is applied to the set input of the bistable 49 whose lower output $\bar{Q}$ is fed to the AND gates 47, 50 and 52. Assuming that a path-finding pulse is travelling along line P, then the inputs to AND gate 47 will each be on, and the output of bistable 49, which is on, will set switch 48 to its closed position so that a signal on line C passes through diode 58 and out along lines C3 and C4, being blocked by diodes 59 and 60 so as not to affect switches 51 and 53. The pulse on line P is applied to the SET input of bistable 49, causing Q output of bistable 49 to activate the monostable 45 which outputs pulses along lines P3 and P4. A RESET signal is applied to the switches 48, 51 and 53 at 55, 56 and 57 respectively so as to open any switch which may have been closed by a previous path-finding pulse. The RESET signal also flips the bistable 49. The above behavior is summarized as follows: a RESET signal opens all of the direct current switches 48, 51 and 53. A pulse entering on line P (mutatis mutandis P1 or P2) closes its own direct current switch 48 (mutatis mutandis 51 or 53) and flips bistable 49 causing a $\bar{Q}$=0 signal to be applied to the AND gates 47, 50 and 52. Thus, no switches other than that in its own line can be closed by pulses entering on P (P1, P2) lines and later pulses are prevented from being transmitted through the exchange (node) until a reset signal is applied to the exchange.

Figure 4:
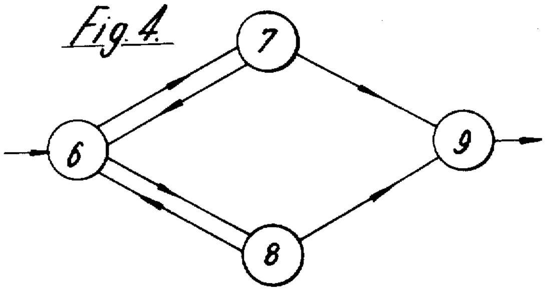
FIG. 4 is a simple network having the direction of each connecting link indicated.

FIG. 4 illustrates a simple network having the directions indicated upon the connections between nodes and having switches and reset facilities as described above. The only permitted paths between 6 and 9 are 6–7–9 and 6–8–9. Paths which contain loops, for example (6–7–6)–8–9, (6–8–6)–7–9, 6–7–67–9 etc., are not permitted.

Figure 5:
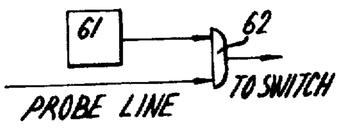
FIG. 5 shows an adaptive element whose output together with a probe signal in a link are applied to an AND gate.
Figure 6:
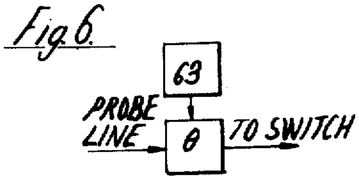
FIG. 6 shows an adaptive element controlling a threshold gate to which probe signals in a link are applied.

FIG. 5 illustrates one form of control that an adaptive element exerts over the probability that a link is traversed. The output of the adaptive element 61 in the form of a pulse stream is applied to a two-input AND gate 62 whose other input is the probe or path-finding pulse. The probability that the path-finding pulse will close the switch equals the duty ratio of ones in the output of the adaptive element. FIG. 6 illustrates another form of control wherein the output of an adaptive element 63 is used to set the threshold of a threshold sensitive device $\theta$, thus again controlling the probability that a path-finding pulse will close a switch.

As an alternative to, or supplementing a wall-mounted display, the invention can be constructed on circuit boards and inserted as a stored program in an electronic computer such as may be employed for example in an electronic exchange for a national or international telephone network.

Similarly the invention can be incorporated in computers for simulation or problem solving in the fields of economics or psychology.

It is to be understood that the foregoing description of specific examples of this invention is made by way of example only and is not to be considered as a limitation on its scope.

We claim:

1. A network containing nodes and links therebetween, each of said links having therein a switch controlled by an adaptive element, said adaptive elements including means to control the probability that a signal which emanates from the node traverses the link containing the adaptive element, said probability being determined by the output state of said adaptive element, and means operated in cooperation with said adaptive element whereby an node which receives and passes on a signal is inhibited from receiving a further signal without first being reset.

2. A network as claimed in claim 1 wherein at least one of the said links have delays therein.

3. A network as claimed in claim 2 wherein means are provided for updating the state of the adaptive elements by information obtained from sampling the occupancy of links of a real system of which the network is a model.

4. A network as claimed in claim 3 and a computer, said network being operatively connected to said computer to control the performance of said computer.

5. A network as claimed in claim 3 wherein lights switched by links of the network provided an illuminated display of the path through the network.

6. A network as claimed in claim 3, wherein the inputs to a node from one of the links include a pulse-sensitive switch arranged to be closed by a control signal in pulse form, said control signal emanating from said node, information or current signals carried by the link being undisturbed by such a pulse control signal.

7. A network as claimed in claim 3 wherein the inputs to a node from one of the links include a current sensitive switch arranged to pass a signal in one direction and to be locked in the closed position by a voltage applied between ends of the appropriate link and to be unlocked by the application of a reset signal.

8. A network as claimed in claim 3 wherein at least one of the links contains an AND gate to which any probe signal through the link and the output of the adaptive element of that link are arranged to be applied.

9. A network as claimed in claim 3 wherein the adaptive element in one of the links sets the threshold of a threshold gate to which signals through the said link are applied.

10. A method of extracting a path between a sending node and a receiving node of a network containing nodes and links therebetween, each of said links having therein a switch controlled by an adaptive element, said adaptive elements including means to control the probability that a signal which emanates from the node traverses the link containing the adaptive element, said probability being determined by the output state of said adaptive element, and means operated in cooperation with said adaptive element whereby any node which receives and passes on a signal is inhibited from receiving a further signal without first being reset, wherein at least one of the said links have delays therein, and wherein means are provided for updating the state of the adaptive elements by information obtained from sampling the occupancy of links of a real system of which the network is a model, the method including the steps of applying a probe signal to the sending node and when the probe signal has been received at the receiving node locking the switches in these links traversed by the probe signal.